(12) United States Patent
Stuart et al.

(10) Patent No.: US 8,748,515 B2
(45) Date of Patent: Jun. 10, 2014

(54) MIXTURES AND EMULSIONS FOR USE IN PROVIDING STRENGTH TO GYPSUM COMPOSITIONS

(75) Inventors: Jonathan T. Stuart, Lansdale, PA (US); William J. Werts, Glenolden, PA (US)

(73) Assignee: Henry Company LLC, El Segundo, CA (US)

(*) Notice: Subject to any disclaimer, the term of this patent is extended or adjusted under 35 U.S.C. 154(b) by 0 days.

(21) Appl. No.: 13/031,167

(22) Filed: Feb. 18, 2011

(65) Prior Publication Data

US 2011/0257301 A1 Oct. 20, 2011

Related U.S. Application Data

(60) Provisional application No. 61/324,739, filed on Apr. 15, 2010.

(51) Int. Cl.
*C08K 3/00* (2006.01)

(52) U.S. Cl.
USPC .................................. 524/5; 524/8

(58) Field of Classification Search
USPC ............................................ 524/5
See application file for complete search history.

(56) References Cited

U.S. PATENT DOCUMENTS

| | | | |
|---|---|---|---|
| 2,198,776 A | 4/1940 | King et al. |
| 4,042,409 A | 8/1977 | Terada et al. |
| 4,258,102 A | 3/1981 | Traver et al. |
| 4,434,196 A | 2/1984 | Robinson et al. |
| 4,447,498 A | 5/1984 | Fink et al. |
| 4,748,196 A | 5/1988 | Kuroda et al. |
| 5,120,355 A | 6/1992 | Imai |
| 5,158,612 A | 10/1992 | Savoly et al. |
| 5,177,120 A | 1/1993 | Hare et al. |
| 5,264,028 A | 11/1993 | Beshay |
| 5,366,810 A | 11/1994 | Merrifield et al. |
| 5,437,722 A | 8/1995 | Borenstein |
| 5,618,627 A | 4/1997 | Merrifield et al. |
| 5,695,551 A | 12/1997 | Buckingham et al. |
| 5,695,553 A | 12/1997 | Claret et al. |
| 5,714,001 A | 2/1998 | Savoly et al. |
| 5,821,298 A | 10/1998 | Reynolds et al. |
| 5,968,237 A | 10/1999 | Sinnige |
| 6,001,286 A | 12/1999 | Sleeter |
| 6,010,596 A | 1/2000 | Song |
| 6,051,155 A | 4/2000 | Hocken et al. |
| 6,106,607 A | 8/2000 | Be et al. |
| 6,171,388 B1 | 1/2001 | Jobbins |
| 6,323,268 B1 | 11/2001 | Fisher et al. |
| 6,403,163 B1 | 6/2002 | Fisher et al. |
| 6,406,779 B1 | 6/2002 | Carbo et al. |
| 6,481,171 B2 | 11/2002 | Yu et al. |
| 6,585,820 B2 | 7/2003 | Wantling et al. |
| 6,663,707 B2 | 12/2003 | Wantling et al. |
| 6,811,824 B2 | 11/2004 | Hassan et al. |
| 6,890,976 B2 | 5/2005 | Sinnige |
| 6,890,982 B2 | 5/2005 | Borsinger et al. |
| 6,902,615 B2 | 6/2005 | Shoshany |
| 6,929,875 B2 | 8/2005 | Savoly et al. |
| 7,033,432 B2 | 4/2006 | Savoly et al. |
| 7,048,794 B2 | 5/2006 | Tagge et al. |
| 7,192,909 B2 | 3/2007 | Richter et al. |
| 7,220,373 B2 | 5/2007 | Martin et al. |
| 7,267,743 B2 | 9/2007 | Borsinger et al. |
| 7,294,189 B2 | 11/2007 | Wantling |
| 7,544,242 B2 | 6/2009 | Liu et al. |
| 7,572,329 B2 | 8/2009 | Liu et al. |
| 7,615,504 B2 | 11/2009 | Porter et al. |
| 7,879,965 B2 | 2/2011 | Westerman |
| 2002/0017222 A1 | 2/2002 | Luongo |
| 2002/0195025 A1 | 12/2002 | Bacher et al. |
| 2003/0131763 A1 | 7/2003 | Wantling et al. |
| 2004/0083928 A1 | 5/2004 | Shoshany |
| 2004/0147644 A1 | 7/2004 | Sinnige |
| 2004/0157962 A1 | 8/2004 | Sinnige |
| 2005/0132926 A1 | 6/2005 | Cui et al. |
| 2006/0029785 A1 | 2/2006 | Wang et al. |
| 2006/0029787 A1 | 2/2006 | Wang et al. |
| 2006/0035112 A1 | 2/2006 | Veeramasuneni et al. |
| 2006/0196391 A1 | 9/2006 | Hassan et al. |
| 2006/0283356 A1 | 12/2006 | Donlon et al. |
| 2007/0095723 A1 | 5/2007 | Baralt et al. |
| 2007/0181035 A1 | 8/2007 | Wantling et al. |
| 2007/0245931 A1 | 10/2007 | Wantling |
| 2008/0003384 A1 | 1/2008 | Murphy et al. |
| 2008/0057290 A1 | 3/2008 | Guevara et al. |
| 2008/0070026 A1 | 3/2008 | Yu et al. |
| 2008/0210136 A1* | 9/2008 | Petit et al. ............... 106/780 |
| 2008/0286609 A1 | 11/2008 | Surace et al. |
| 2009/0025850 A1 | 1/2009 | Feigin et al. |
| 2009/0203565 A1 | 8/2009 | Dooley et al. |

(Continued)

FOREIGN PATENT DOCUMENTS

| CA | 2292467 C | 1/2008 |
|---|---|---|
| CN | 1624206 A | 6/2005 |

(Continued)

OTHER PUBLICATIONS

PCT International Search Report and Written Opinion, International Application No. PCT/US2011/025562, Apr. 28, 2011, 9 pages.

(Continued)

*Primary Examiner* — Hui Chin
(74) *Attorney, Agent, or Firm* — Flaster/Greenberg PC

(57) ABSTRACT

Settable gypsum compositions are described herein which include a gypsum slurry, comprising water; and a first additive comprising a vinyl acetate/ethylene copolymer in latex or emulsion form and a second additive which is at least one of (i) a wetting agent and/or a surfactant; (ii) a titanium coupling agent, (iii) a zirconium coupling agent, and (iv) mixtures thereof. The compositions demonstrate improved strength and gypsum core adhesion. Such compositions may also include at least one dispersant and/or a wetting agent and/or a surfactant. Such dispersants may be lignosulfonic acid, naphthalene sulfonic acid, and combinations and salts thereof and the wetting agent and/or surfactant may be N-dodecyl 2-pyrrolidone, ethoxylated alcohol, and combinations thereof. The dispersant and/or wetting agents and/or surfactants can further enhance rheological properties to benefit the enhanced strength gypsum compositions.

25 Claims, No Drawings

US 8,748,515 B2

Page 2

(56) References Cited

U.S. PATENT DOCUMENTS

| | | | |
|---|---|---|---|
| 2010/0043344 A1 | 2/2010 | Tada et al. | |
| 2010/0116406 A1 | 5/2010 | Mahoney et al. | |
| 2010/0152347 A1* | 6/2010 | Mahoney et al. | 524/176 |
| 2010/0186870 A1* | 7/2010 | Stuart et al. | 156/39 |

FOREIGN PATENT DOCUMENTS

| | | |
|---|---|---|
| EP | 0 692 924 A1 | 1/1996 |
| EP | 1 947 070 A1 | 9/2006 |
| GB | 1 471 713 A | 4/1977 |
| JP | 59-058067 A2 | 4/1984 |
| JP | 60-262854 A2 | 12/1985 |
| JP | 61-042572 A | 3/1986 |
| JP | 2003/106976 A2 | 5/1991 |
| JP | 2004/034167 A2 | 2/1992 |
| JP | 2005/004496 A2 | 1/1993 |
| JP | 2007/018222 A2 | 1/1995 |
| JP | 2007/102071 A1 | 4/1995 |
| JP | 2009/165474 A2 | 6/1997 |
| JP | 2000/233962 A2 | 8/2000 |
| JP | 2001/181016 A2 | 7/2001 |
| JP | 2000/218724 A2 | 8/2008 |
| WO | WO 81/00232 | 2/1981 |
| WO | WO 02/00799 | 1/2002 |
| WO | WO 2007/061093 A1 | 5/2007 |
| WO | WO 2008/092990 A2 | 8/2008 |
| WO | WO 2010/025207 A1 | 3/2010 |

OTHER PUBLICATIONS

Pingel, Laura Jean, Thesis, "Studies on Bonding in Paper—Gypsum Composite Structures," Chapter 5.1.2 Coupling Agent Additions, May 1990, 171 pages (see pp. 99-108, 163-165).

Tomasiewicz, Ryan, Thesis "The Adhesion of Paperboard to the Gypsum Core of Wallboard: An Investigation of Adhesive Bond Quality in Response to Paper Production Variables and Relative Humidity," Jun. 2003, 70 pages (see pp. 20-21).

Product Bulletin, Synthemul® HS-200, Reichhold, Mar. 2004, 3 pages.

TufCOR™ 3610, C3elanese Emulsion Polymers, Jul. 2009, 1 page.

Product Data Sheet, Ken-React® LICA® 09—Titanate Coupling Agent, Sep. 26, 2007, 2 pages.

Material Safety Data Sheet, Ken-React® LICA® 09, Kenrich Petrochemicals, Inc., Dec. 2006, 6 pages.

Technical Data Sheet, VINNAPAS® 192 (CGN), Wacker Polymers, Feb. 4, 2010, 3 pages.

Technical Data Sheet, VINNAPAS® 323, Wacker Polymers, Oct. 6, 2009, 2 pages.

Technical Data Sheet, VINNAPAS® 400, Wacker Polymers, Oct. 6, 2009, 3 pages.

Technical Data Sheet, VINNAPAS® 400H, Wacker Polymers, Sep. 18, 2009, 3 pages.

Technical Data Sheet, VINNAPAS® 401, Wacker Polymers, Oct. 22, 2009, 2 pages.

Technical Data Sheet, VINNAPAS® 410, Wacker Polymers, Oct. 30, 2009, 3 pages.

Technical Data Sheet, VINNAPAS® 426, Wacker Polymers, Oct. 6, 2009, 2 pages.

Technical Data Sheet, VINNAPAS® 465, Wacker Polymers, Oct. 7, 2009, 2 pages.

Technical Data Sheet, VINNAPAS® 920, Wacker Polymers, Nov. 11, 2009, 3 pages.

Technical Data Sheet, VINNAPAS® EP1400, Wacker Polymers, Mar. 16, 2009, 3 pages.

Technical Data Sheet, Mowilith DM 137® , Celanese Emulsions, Mar. 2006, 2 pages.

Poirier, M.R. et al., "Cross-Flow Filtration Demonstration for Slurries Containing High Level Waste Sludge and Monosodium Titanate," Westinghouse Savannah River Company, Dec. 12, 2001, 27 pages.

Lee, Sallie, et al., "A New Generation of Gypsum Dispersing Agents," Lyondell Chemical Company, Global Gypsum Conference 2003 Barcelona, Sep. 14-16, 2003, 12 pages.

Monte, Salvatore, "Titanates," Kenrich Petrochemicals, Inc., Chapter 4, 26 pages.

Monte, Salvatore J., Titanates and Zirconates—Nano Technology in Coatings 2007, Kenrich Petrochemicals, Inc., ICE 2007, 291 pages (see pp. 1-40).

Australian Application 2011241030 (counterpart) Patent Examination Report No. 1 (3 pages) Feb. 25, 2013.

* cited by examiner

MIXTURES AND EMULSIONS FOR USE IN PROVIDING STRENGTH TO GYPSUM COMPOSITIONS

CROSS-REFERENCE TO RELATED APPLICATIONS

This application claims the benefit, under 35 U.S.C. §119 (e) of U.S. provisional patent application No. 61/324,739, filed Apr. 15, 2010, the entire disclosure of which is incorporated herein by reference.

BACKGROUND OF THE INVENTION

1. Field of the Invention

The invention relates to the field of wax emulsions and mixtures for addition to settable gypsum formulations, and more particularly to the field of such mixtures and emulsions for making gypsum wallboards having good strength properties.

2. Description of Related Art

Gypsum wallboard is used for forming interior and exterior walls of many building structures. The structure of the wallboard typically includes a gypsum composition which is generally prepared as a slurry composition, which is placed between two liners and set. Such wallboard gypsum compositions may be standard wallboard formulations or made to be water-resistant through, for example, the use of various wax emulsions. Some of the more common commercial water-resistant wax emulsions involve use of particular wax components (which may include a single wax, or more typically, a blend of waxes), saponifying agent(s), emulsifier(s), stabilizer(s) and other additives.

Of growing importance in the wallboard industry is the ever-increasing cost of manufacture of wallboard with respect to the rising cost of formulation components as well as increasing energy costs. For example, it is known in the art that manufacturing methods for formation of building products like gypsum wallboard that use emulsions in formation of the finished products, typically require a drying step or steps that consume energy. Thus, it would be beneficial to manufacture gypsum wallboard (standard and water-resistant) if the drying energy could be reduced for cost savings, particularly when energy demands are growing for manufacturers. Components, time and steps required in manufacture are also a concern, as is the quality of the resulting wallboard.

With respect to the manufacture of water-resistant wallboards, U.S. Pat. No. 5,437,722 describes a water-resistant gypsum composition and wax emulsion therefor, which includes a paraffin hydrocarbon having a melting point of about 40° C. to 80° C., about 1 to 200 parts by weight montan wax per 100 parts of the paraffin hydrocarbon, and about 1 to 50 parts by weight polyvinyl alcohol per 100 parts of the paraffin hydrocarbon. The use of montan wax in the wax emulsion for water-resistant wallboard has been very effective and provides excellent performance. Other water-resistant formulations based on natural waxes other than montan (such as carnauba and bees wax) and/or synthetic waxes (such as Fischer-Tropsch wax) have been used as well as alternative water-resistant wax formulations. Most such formulations provide good water-resistance in gypsum wallboard formulations. However, some waxes typically used for such emulsions are in limited supply and/or are very expensive. Further, while strong water-resistance can be achieved, it would be desirable to achieve good water resistance properties in gypsum wallboard, while lowering the cost of components, increasing supply and/or reducing manufacturing costs.

There have been attempts to enhance physical properties of wallboard, however, many such proposed enhancements are expensive and/or complex and/or involve additional manufacturing steps such that the process becomes less economical. Many boards are strengthened with fibrous reinforcement, such as woven mats, but getting the slurry to adhere to the mat is typically an issue. In some instances extra films and/or mats are laminated onto the wallboard during or after its formation to increase the impact strength and other mechanical properties of the wallboard.

For example, WO 2010/025207 A1 describes a durable and strong gypsum board having woven porous mats, such as mats made from fibers and held together with a binder such as a urea, a dense slurry layer penetrating the porous mats which may have a thermoplastic pre-coating thereon. A core of slurry is also provided. The plastic layer provided on the mats is to mechanically adhere to polymer additives in the dense slurry layers surrounding the mats. External coating layers are also provided to the wallboard. The disclosure describes the mats as providing strength to the board. Polymer additives suggested to bond with the mats and increase strength are polyvinylidene chloride, polyvinyl chloride, and similar polymers, as well as functionalized styrene butadiene latex and silane compounds which may also serve as stabilizers.

U.S. Pat. No. 7,615,504 also teaches a fiber-mat reinforced board wherein the board can have a core of gypsum or Portland cement. This patent also teaches additional sizing, coatings and binders for the mats. The additional plastic coating on the mat may include various polymers including polyvinyl acetate, polyvinyl chloride and other polyvinyl copolymers.

U.S. Pat. No. 7,048,794 teaches addition of various starch compounds including substituted starch and polysaccharides to enhance strength in gypsum boards.

U.S. Pat. No. 6,406,799 teaches a paperless wallboard having a primer for providing a smoother surface and improved surface characteristics, wherein the primer incorporates a water-based system that heat cures to improve the surface of the board. The primer can include a latex that is an aqueous emulsion of a film-forming polymer having a glass transition temperature of 10-40° C., such as acrylic polymers and copolymers, polyvinyl acetate/acrylate copolymers, ethylene vinylchloride/vinyl acetate polymers and others.

Polymer additives are also provided to other building materials aside from gypsum compositions for strength and/or flexibility. For example, U.S. Publication No. 2002/0195025 A1 teaches a powder composition for addition as a rheological additive for water retention and thixotropic purposes in cement-containing mortar compositions or "cement-free" mortar compositions, in place of or in addition to cellulosic materials typically used, wherein the powder includes a copolymer of methacrylic acid and methacrylic esters, a dispersant and a polymer powder redispersible in water, including a variety of vinyl-based copolymers including ethylene vinyl acetate copolymers. Such additives are asserted to improve rheological properties without negatively impacting curing of the mortar.

Accordingly, there is a need in the art for compositions and methods that improve the properties of gypsum wallboard while preferably also keeping the costs of manufacturing including reducing energy costs at or lower than standard levels, and that avoids adding complex process steps or expensive components.

BRIEF SUMMARY OF THE INVENTION

The present invention provides a settable gypsum composition, comprising: a gypsum slurry, comprising water; a first additive comprising a vinyl acetate/ethylene copolymer in latex or emulsion form, and a second additive which is at least one of (i) a wetting agent and/or a surfactant; (ii) a titanium coupling agent, (iii) a zirconium coupling agent, and (iv) mixtures thereof. The compositions having the combination of additives provides a finished gypsum-containing product with enhanced strength and which has better adhesion of components within the gypsum core and improved adhesion of the core to the paper and/or mat where a paper covered gypsum board is being made. Thus, the invention provides enhanced strength throughout the thickness of a resulting gypsum board and, for paper gypsum boards, also provides enhanced strength at the paper/mat interface with the core.

The composition may further comprise at least one dispersant, which may comprise sulfur or a sulfur-containing group. In one embodiment, the dispersant is lignosulfonic acid, naphthalene sulfonic acid, and combinations and salts thereof and the second additive may comprises the wetting agent and/or the surfactant. The wetting agent and/or the surfactant has an HLB of from about 3 to 16. The wetting agent and/or the surfactant is preferably selected from the group consisting of fatty alcohols, ethoxylated alcohols, vegetable oil ethoxylates, alkyl phenol ethoxylates, monobasic esters, silicone polyethers, alkylated or alkenylated pyrrolidone-based compounds, asphaltene dispersants, acetylenic diols, ethylene oxide/polyethylene oxide block copolymers, polyethylene glycols, polyethylene glycol esters, alkylbenzenesulfonic acids, alkylbenzene sulfonate, sodium salts, potassium salts, amine salts, sodium alkylated diphenyl oxide disulfonates, amine oxides, amine ethoxylates, alkanolamides, sodium and ammonium aromatic sulfonates, alcohol sulfates, alcohol ether sulfates, ethoxylated alcohol phosphate esters, ethoxylated alcohol sulfates, sodium alkyl sulfonates, sodium alpha sulfo methyl esters, sodium dialkyl sulfosuccinates, and fluoroaliphatic surfactants.

In a further embodiment, the invention includes a settable gypsum composition, comprising: a gypsum slurry, comprising water; a first additive comprising a vinyl acetate/ethylene copolymer in latex or emulsion form, and a second additive which is at least one of (i) a wetting agent and/or a surfactant; (ii) a titanium coupling agent, (iii) a zirconium coupling agent, and (iv) mixtures thereof, wherein the second additive comprises the wetting agent and/or the surfactant. The wetting agent and/or the surfactant may have an HLB of from about 3 to 16. Such a composition may also comprise a dispersant selected from the group consisting of lignosulfonic acid, naphthalene sulfonic acid, and combinations and salts thereof and wherein the second additive is the wetting agent and/or the surfactant and is selected from the group consisting of N-dodecyl 2-pyrrolidone, ethoxylated alcohol, and combinations thereof.

In a further embodiment, in the composition noted above, the second additive is the wetting agent and/or the surfactant and the composition comprises about 75 percent by weight to about 99.999 percent by weight of the gypsum slurry; about 0 percent by weight to about 5 percent by weight of a dispersant; about 0.001 percent by weight to about 10 percent by weight of the first additive; and about 0 percent by weight to about 10 percent of the wetting agent and/or the surfactant. In a further preferred embodiment, the composition comprises about 87 percent by weight to about 96.89 percent by weight of the gypsum slurry; about 0.1 percent by weight to about 2 percent by weight of the dispersant; about 0.01 percent by weight to about 2 percent by weight of the first additive; and about 0.01 percent to about 3.0 percent of the surfactant and/or wetting agent.

The compositions noted above may also include a wax emulsion, wherein the first additive and the second additive are incorporated into the wax emulsion prior to incorporating the wax emulsion into the gypsum slurry. The wax emulsion may comprise, water; at least one wax; the first additive comprising a vinyl acetate/ethylene copolymer in latex or emulsion foam; and the second additive. In such an emulsion, the at least one wax may comprise one or more of montan wax, paraffin wax, carnauba wax, a Fischer-Tropsch wax, and derivatives and blends thereof. Preferably, the at least one wax is a blend of paraffin wax with montan wax. The emulsion may also include a polyvinyl alcohol stabilizer, for example, a polyvinyl alcohol which is about 97% to about 100% hydrolyzed polyvinyl alcohol. The emulsion may also include a saponifying agent which is an alkali metal hydroxide, such as alkali metal hydroxide is potassium hydroxide. A dispersant may also be provided which comprises a sulfur or a sulfur-containing group. In one embodiment, the dispersant is lignosulfonic acid, naphthalene sulfonic acid, and combinations and salts thereof.

In one such embodiment of the composition, the second additive comprises the wetting agent and/or the surfactant. Preferably, the wetting agent and/or the surfactant has an HLB of from about 3 to 16. The wetting agent and/or the surfactant, for example, is selected from the group consisting of fatty alcohols, ethoxylated alcohols, vegetable oil ethoxylates, alkyl phenol ethoxylates, monobasic esters, silicone polyethers, alkylated or alkenylated pyrrolidone-based compounds, asphaltene dispersants, acetylenic diols, ethylene oxide/polyethylene oxide block copolymers, polyethylene glycols, polyethylene glycol esters, alkylbenzenesulfonic acids, alkylbenzene sulfonate, sodium salts, potassium salts, amine salts, sodium alkylated diphenyl oxide disulfonates, amine oxides, amine ethoxylates, alkanolamides, sodium and ammonium aromatic sulfonates, alcohol sulfates, alcohol ether sulfates, ethoxylated alcohol phosphate esters, ethoxylated alcohol sulfates, sodium alkyl sulfonates, sodium alpha sulfo methyl esters, sodium dialkyl sulfosuccinates, and fluoroaliphatic surfactants.

A dispersant may also be provided which is selected from the group consisting of lignosulfonic acid, naphthalene sulfonic acid, and combinations and salts thereof. The composition preferably includes a second additive which is the wetting agent and/or the surfactant and which is selected from the group consisting of N-dodecyl 2-pyrrolidone, ethoxylated alcohol, and combinations thereof.

In one embodiment herein, the settable gypsum composition having an optional wax emulsion noted above comprises about 35 percent by weight to about 80 percent by weight of the water; about 15 percent by weight to about 60 percent by weight of a blend of paraffinic hydrocarbon and the at least one wax; about 0.01 percent by weight to about 2 percent by weight of a dispersant; about 0.001 percent by weight to about 10 percent by weight of the first additive; about 0.001 percent by weight to about 10 percent by weight of the second additive; and about 0 percent by weight to about 30 percent by weight of at least one stabilizer. In a further preferred embodiment, the composition having an optional wax emulsion comprises about 50 percent by weight to about 65 percent by weight of the water; about 20 percent by weight to about 40 percent by weight of the blend of paraffinic hydrocarbon and the at least one wax; about 0.1 percent by weight to about 2 percent by weight of the dispersant; about 0.01 percent by weight to about 2 percent by weight of the first additive; about 0.01 percent by weight to about 2 percent by weight of the second additive; and about 0 percent by weight to about 10 percent by weight of the at least one stabilizer.

The invention further comprises an improvement for a method of making gypsum wallboard, wherein the method comprises preparing a gypsum slurry, using the gypsum slurry to form a structure and drying the structure to form a gypsum wallboard. The improvement comprises providing a gypsum slurry, comprising water, a first additive comprising a vinyl acetate/ethylene copolymer in latex or emulsion form and a second additive which is at least one of (i) a wetting agent and/or a surfactant; (ii) a titanium coupling agent, (iii) a zirconium coupling agent, and (iv) mixtures thereof. The method may further include placing the gypsum slurry between two liners to form the structure.

In addition, a method is provided herein for improving strength in gypsum wallboard, comprising, providing a formulation for forming a gypsum wallboard comprising a gypsum slurry; and a first additive comprising a vinyl acetate/ethylene copolymer in latex or emulsion form; and a second additive which is at least one of (i) a wetting agent and/or a surfactant; (ii) a titanium coupling agent, (iii) a zirconium coupling agent, and (iv) mixtures thereof.

DETAILED DESCRIPTION OF THE INVENTION

The compositions herein provide enhanced strength gypsum wall board. Such compositions can be made as direct settable gypsum compositions and/or gypsum compositions that have added thereto a wax emulsion, for example, for providing water-resistance. Methods for improving strength and/or improving gypsum manufacture are also provided which are derived from such strength-enhanced compositions. The compositions described herein in some embodiments are further able to reduce energy costs and provide manufacturing cost savings by providing good or improved slurry viscosity as well to reduce water content generally so that drying times and/or temperature (heat use) may be reduced and to improve thixotropic and rheological properties of the strength-enhanced compositions.

The settable gypsum compositions herein include a gypsum slurry which includes water; and at least a first strength additive(s) that include a vinyl acetate/ethylene copolymer(s) in latex or emulsion form. Such additives can be added singularly or in combination. The composition also includes a second additive which is one or more of a wetting agent and/or a surfactant; a titanium coupling agent, a zirconium coupling agent, and mixtures and combinations of the wetting agent(s), surfactant(s) and titanium and/or zirconium coupling agents. The combination of the first and second additives provides a gypsum product, such as a gypsum wallboard having enhanced strength for the gypsum formulation and better adhesion of the calcium-based components within the gypsum core, thus providing enhanced strength throughout the thickness of the board.

The gypsum slurry and the first and second additives in the gypsum slurry may be blended in one embodiment in weight ratios of about 0.001:100 to about 10.0:100. Such gypsum slurries may be any gypsum slurry known or to be developed in the art, for example, a standard calcium sulfate hemihydrate and water slurry normally used to form a gypsum core, wherein the calcium sulfate hemihydrate is able to react with water in the slurry to form an interlocking matrix of calcium sulfate dihydrate crystals, and to thereby set and cure to form a hard gypsum board. Water is typically added to the slurry in excess of what is needed for the setting hydration reaction, as some water is provided for fluidity out of the slurry mixing equipment for shaping the board into the proper width and thickness. In some embodiments herein, the amount of water can be minimized if rheological additives noted herein are provided to the formulation.

The first additives used herein in the additive combination for providing strength and core adhesion, may be any of a variety of vinyl acetate latex or emulsion polymers and copolymers, such as alkyl vinyl acetate and alkylene vinyl acetate latex or emulsion polymers and copolymers, and more preferably ethyl vinyl acetate or ethylene vinyl acetate copolymers in latex or emulsion form. Similar latex or emulsion vinyl-based polymers or copolymers that can enhance the basic strength and adhesion capabilities of the core gypsum slurry may also be used. Other suitable strength enhancing additives may include vinyl acetate/acrylate copolymers, alkyl or alkylene vinyl acetate/acrylate copolymers. Preferably such polymers are provided in latex or emulsion form for better penetration and adhesion within the slurry. Such copolymers may also be functionalized with groups that can enhance the strength function or compatibility of the polymers, wherein functional groups can be provided off a primary or secondary polymer chain, such as phosphorus-, potassium-, sulfur-, and calcium-containing groups and/or salts; halogens such as bromine, iodine, fluorine and the like; halogenated alkyl or alkylene groups; metal or metalloid ions or complexes; and aromatic or aryl functionalized groups.

Commercially available suitable ethylene vinyl acetate copolymers are available from Celanese Emulsion Polymers as TufCOR® 3610, Dur-O-Set®3610, Dur-O-Set®137A, and as Mowilith® 137A. Other suitable copolymers are available from Wacker Chemie, AG, Germany, include (vinyl alcohol) stabilized vinyl acetate-ethylene copolymer dispersions sold under the name Vinnapas®, such as Vinnapas® 323, Vinnapas® 400, Vinnapas® 400 H, Vinnapas® EF 811, Vinnapas® 192, Vinnapas® 400, vinyl acetate ethylene copolymer emulsions from Forbo, Switzerland sold under the name Elvace® CPS, such as CPS 137A and CPS786, and VAEs from Reichhold, N.C., US sold under the name Synthemul® HS200, from Hersteller Kuraray Co., Ltd. as CP-Polymer®, CP1210 T30, and from AirProducts, Inc. as AirFlex® EN1165.

The settable gypsum composition may further optionally include at least one dispersant. Dispersants which may be used in the composition and are preferred for use in combination with the strength additives herein, include, but are not limited to those having a sulfur or a sulfur-containing group(s) in the compound such as sulfonic acids (R—S($=$O)$_2$—OH) and their salts, wherein the R groups may be otherwise functionalized with hydroxyl, carboxyl or other useful bonding groups. Preferred are higher molecular weight sulfonic acid compounds such as lignosulfonic acid, naphthalene sulfonic acid, the sulfonate salts of these acids and derivatized or functionalized versions of these materials. In addition, other dispersants known in the art for use in wax emulsions, such as magnesium sulfate; ammonium hepta molybdate/starch combinations; non-ionic surfactants, ionic surfactants, zwitterionic surfactants and mixtures thereof; and alkyl quaternary ammonium montmorillonite clay as well as other known dispersants may be used. Preferred dispersants are lignosulfonic acid, naphthalene sulfonic acid, and combinations and salts thereof. Such dispersants may be provided directly to a gypsum slurry as an optional component or added to a wax emulsion which is provided to the slurry as described elsewhere herein.

The composition also includes a second additive which may be a wetting agent and/or a surfactant used alone or in combination with an organic zirconium compound and/or an organic titanium compound.

Wetting agents and/or surfactants which may be used are materials which preferably have an HLB of from about 3 to 16. Non-limiting examples of such wetting agents and/or surfactants include fatty alcohols, ethoxylated alcohols, vegetable oil ethoxylates, alkyl phenol ethoxylates, monobasic esters, silicone polyethers, alkylated or alkenylated pyrrolidone-based compounds, asphaltene dispersants, acetylenic diols, ethylene oxide/polyethylene oxide block copolymers, polyethylene glycols, polyethylene glycol esters, alkylbenzenesulfonic acids, alkylbenzene sulfonate, sodium salts, potassium salts, amine salts, sodium alkylated diphenyl oxide disulfonates, amine oxides, amine ethoxylates, alkanolamides, sodium and ammonium aromatic sulfonates, alcohol sulfates, alcohol ether sulfates, ethoxylated alcohol phosphate esters, ethoxylated alcohol sulfates, sodium alkyl sulfonates, sodium alpha sulfo methyl esters, sodium dialkyl sulfosuccinates, and fluoroaliphatic surfactants.

The wetting agents and/or surfactants can be used independently or in blends of more than one material. Such materials may be cationic, anionic or zwitterionic, although cationic materials are preferred if working with a harder, more ionic water and to avoid excessive foam which may arise with some anionic surfactants. Wetting agents and/or surfactants are preferred if they are more neutral with respect to foam formation. While some foaming is necessary, it is preferred to avoid excessive foaming as it may negatively impact wallboard characteristics.

Silicone polyethers noted above may be, for example, one of the following (commercially available from Siltech Corporation): silicone polyethers (available under the trade name Silsurf®); phosphate silicone polyether ethers (available under the trade name Silphos®); silicone polyether quaternary compounds (available under the name Silquat®); silicone polyether alkyl polyethers (available under the trade name Silube®); silicone defoamers (available under the trade name Siltech®); fluorinated silicones (available under the trade name Fluorosil®); or silicone pre-polymers (available under the trade name Silmer®). Other similar compounds are available from other manufacturers as well. For example, the additive may be one of the following (commercially available from Momentive Performance Materials): silicone copolymer/polyalkylene oxide blends or polyalkyleneoxide modified polydimethylsiloxanes (available under the trade name Silwet®, including Hydrostable®). The additive may also be an alternative modified polysiloxane (available under the trade name Silbyk® products, commercially available from Byk Additives and Instruments).

If a pyrrolidone-based compound is used as a wetting agent, it is preferably one which has an alkyl or alkenyl group bonded to the structure in preferably the 1 position of the molecule (N position). Examples of such compounds include a 1-octyl 2-pyrrolidone (available under the trade name Surfadone® LP100 from International Specialty Products (ISP)), 1-vinyl 2-pyrrolidone, or most preferably 1-dodecyl 2-pyrrolidone (available under the trade name Surfadone® LP300, also from ISP and also known as N-dodecyl 2-pyrrolidone). Other examples are found in U.S. Pat. No. 7,264,885, incorporated by reference herein in relevant part with respect to such pyrrolidone-based compounds.

If ethoxylated alcohol compounds are provided in the above embodiments they are preferably chosen from a range of either ethylene oxide content and/or alkyl chain length. The alcohol component is preferably about 8 to about 18 carbon atoms in length, and the ethylene oxide content is preferably about 1 to about 50 mole percent. Selections such as a one mole percent ethylene oxide having an alcohol chain length of about 12 to about 13 carbons may be used (such material is commercially available from Air Products and Chemicals, Inc. under the trade name Tomadol® 23-1). Another example compound is a thirteen mole percent ethylene oxide having an alcohol chain length of about 14 to about 15 carbon atoms (available also from Air Products under the trade name Tomadol® 45-13). It should be noted that the one-molar example has a hydrophilic-lipophilic balance (HLB) of 3.7 and the 13 molar example has an HLB value of 14.4.

Additional wetting agents which may be used include acetylenic diols (examples of which are available under the trade name Surfynol® 104 from Air Products and Chemicals, Inc.). Such compounds are also powerful defoamers, and so should be used with the knowledge that defoaming agents can in some instances cause severe issues in the gypsum wallboard manufacturing process by coalescing the intentional air bubbles created in the wallboard to reduce weight. When these air bubbles are coalesced, they can form blisters on the surface of the wallboard during manufacture or even cause the paper or other scrim to de-bond from the gypsum core.

The organic zirconium or organic titanium compounds which may be used either alone or with the above-noted wetting agents and/or surfactants as the second additives in the above-embodiments may be one of the following: The organic zirconium or organic titanium compound additive in the above-embodiments may be one of the following:

titanium IV 2,2(bis-2-propenolatomethyl)butanolato, tris-neodecanato-O;

titanium IV 2,2(bis-2-propenolatomethyl)butanolato, tris(dodecyl)benezenesulfanato-O; titanium IV 2,2(bis-2-propenolatomethyl)butanolato, tris(dioctyl)pyrophosphate-O;

titanium IV 2-propenolatomethyl, tris-isooctadecanoato-O; sodium zirconium lactate;

triethanolamine titanium complex;

titanium phosphate complex;

alkanolamine titanate; and titanium chelate or combinations thereof.

The additive in a further embodiment has the chemical formula:

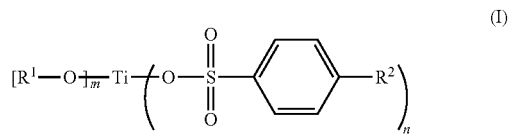

(I)

wherein $R^1$ may be a straight or branched chain, substituted or unsubstituted, alkyl, alkenyl, aralkyl, aralkenyl group of from about 5 to about 30 carbon atoms, wherein the group has from zero to or about 10 oxygen atoms; $R^2$ may be the same or different than $R^1$; and m and n are integers and each is at least 1 and no greater than 4. In yet a further preferred embodiment, $R^1$ is a branched chain alkenyloxy group of about 5 to about 12 carbon atoms and $R^2$ is different from $R^1$ and is a straight chain alkyl group of about 10 to about 15 carbon atoms; and m is 1 and n is 3. In a still further preferred embodiment, the additive has the chemical formula:

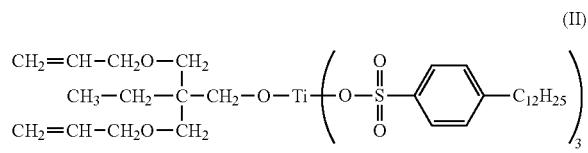

(II)

In one embodiment, the settable gypsum composition noted above includes about 75 percent by weight to about 99.999 percent by weight of the gypsum slurry including water, preferably about 87 percent by weight to about 96.89 percent by weight of the gypsum slurry; about 0 percent by weight to about 5 percent by weight of the dispersant, preferably about 0.1 percent by weight to about 2 percent by weight of the dispersant; about 0.001 percent by weight to about 10 percent by weight of the first additive, preferably about 0.01 percent by weight to about 2 percent by weight of the first additive; and about 0 percent by weight to about 10 percent of the second additive, preferably about 3 percent to about 9 percent of the second additive. The first additive may be a blend of additives having the characteristics as noted above. The second additive may also be a combination of surfactants and/or wetting agents and/or organic titanium and/or organic zirconium compounds. As with the dispersant, the first and second additives may be provided directly to the slurry as noted herein, or provided to the slurry by way of first combining such additive components in a wax emulsion.

In one further embodiment, the gypsum composition may include an optional wax emulsion, wherein the strength additive and optional dispersant and/or wetting agents and/or surfactants noted above may optionally be provided to the composition by incorporating the additive into the wax emulsion prior to incorporating the wax emulsion into the gypsum slurry, or incorporating some of the components in the slurry and some into the slurry through the wax emulsion.

If a wax emulsion is provided, for example for providing water resistance or other desired properties, it preferably includes water; at least one wax; and the strength additive(s) noted above. However, it should be understood by one skilled in the art based on this disclosure that use of a wax emulsion is optional.

If an optional wax emulsion is used, the at least one wax therein may comprise one or more of montan wax, paraffin wax, carnauba wax, a Fischer-Tropsch wax, and derivatives and blends thereof. The at least one wax may also be a blend of paraffin wax with montan wax. The wax emulsion may also comprise a polyvinyl alcohol stabilizer, which polyvinyl alcohol may be about 97% to about 100% hydrolyzed polyvinyl alcohol. Saponifying agents may also be provided to a wax emulsion if used, which agents may be an alkali metal hydroxides, such as potassium hydroxide. Dispersants may also be provided to the wax emulsion, such as those comprising a sulfur or a sulfur-containing group, including lignosulfonic acid, naphthalene sulfonic acid, and combinations and salts thereof. In such a composition, the gypsum formulation includes the first and second additives noted above for rheological property enhancement as well as strength enhancement.

As noted above, the invention may include a wax emulsion for providing water-resistance. As used herein, an emulsion means an emulsified formulation of components, preferably including at least one wax. If the other components are added independently to the slurry, they need not be provided directly to the slurry or through an emulsion, but can be pre-mixed and provided to the slurry as a mixture, which may be any combination of components in a formulation, whether in solution, dispersion, suspension or other liquefied form of combined ingredients. Any such mixtures herein, however, may be modified with emulsification components to become emulsions.

In a wax-based emulsion according to one embodiment herein, the emulsion is an aqueous emulsion and includes water, at least one wax, and the first and second additives herein to provide enhanced strength. Optionally a dispersant and other components are also provided to such an additive emulsion. The water for use in the emulsion may be the same as the water used for forming the slurry, and is preferably water suitable for forming a wax emulsion for building products, such as standard tap water, distilled water, or the like. The water used to prepare the aqueous emulsion should preferably be used in an amount of about 35% to about 80%, preferably about 50% to about 65%, by weight, of the wax emulsion. It should be understood, however, that such amounts may vary depending on desired end properties.

Wax-based emulsions for use herein preferably include a paraffinic hydrocarbon, which is most preferably a paraffin wax. Such paraffin wax may be any suitable paraffin-based wax that functions compatibly with other waxes and components in the resulting wax emulsion, and further preferably has a melting point of about 40° C. to about 80° C., which properties are favorable for water-resistant wallboard manufacture. Other paraffinic hydrocarbons or paraffinic waxes may be used as well.

As defined herein, the at least one wax may include paraffin wax as well as other waxes known in the art or to be developed for use in water-resistant wallboard and various wax substitute components used in such a gypsum wallboard formulation. That is, one skilled in the art would further understand that the at least one wax component may include materials that substitute functionally for or otherwise satisfy the function of the wax material in the wax emulsions herein, for example, synthetic polymers, fatty acid derivatives and the like that are modified to perform like waxes in such a formulation, siloxanes, any other wax substitute known or to be developed in the art, and derivatives and combinations of such materials.

Exemplary waxes which may be used herein include natural montan wax, bleached or refined montan wax, carnauba wax, bees wax, scale wax, slack wax, petroleum waxes, polyethylene wax, soybean wax, corn wax, cottonseed wax, rapeseed wax, canola wax, sunflower wax, palm wax, palm kernel wax, coconut wax, cranberry wax, linseed wax and peanut wax. Other waxes which may be used include synthetic waxes like Fischer-Tropsch wax and mixtures of synthetic wax acids and synthetic wax esters. It should also be understood that derivatized versions of such waxes, to include various COOH or OH groups for performance, oxidized waxes, or combinations of such waxes (whether by blend or polymerized functionalizing of the base polymer as in a modified Fischer-Tropsch wax) can also be used.

It should be understood that while certain waxes as described herein are preferred, such as montan, carnauba and Fischer-Tropsch waxes, if the benefits of the additives herein are otherwise achieved within a wax-substituted product or other wax combination useful, for example, for water-resistant wallboard, the wax combination is contemplated as being within the scope of the invention herein, and the wax selections should not be seen as limiting the scope of the invention as such emulsions are optional. For example, siloxanes (with and without catalytic or other additives), are known for use as water-resistant wax formulation substitutes for preparing water-resistant gypsum wallboard as described in U.S. Patent Publication No. 2006-0035112-A1, incorporated herein in relevant part with respect to the use of various siloxane formulations in preparing gypsum wallboard.

Preferred for use in the emulsions herein are blends of saponifiable and non-saponifiable waxes, most preferably blends of paraffin wax with montan, carnauba and/or Fischer-Tropsch waxes.

The at least one wax should preferably make up about 15 percent to about 60 weight percent of the wax emulsion, and more preferably about 20 percent to about 40 percent by weight. If a blend of a paraffinic hydrocarbon, such as a paraffin wax and another wax or waxes is used, it is preferred that the blend include about 99:1 to about 1:99 paraffin to the other wax(es) in the blend, more preferably about 80:20 to about 20:80, still more preferably about 70:30 to about 30:70, and most preferably 60:40 to 40:60. Further, the wax(es) (including substitutes) are most preferably included in such an emulsion in a total amount of about 1 part to about 200 parts, preferably about 1 part to about 50 parts, by weight, per 100 parts of the paraffinic hydrocarbon. Most preferred blends in the above-noted compositional ranges including paraffin wax and montan wax.

In preferred embodiments, at least one emulsion stabilizer is used. The stabilizer(s) may be any stabilizer known to be used or to be developed for such use in water-resistant wax emulsion formulations. A preferred stabilizer herein is polyvinyl alcohol; preferably one that is prepared by hydrolysis of polyvinyl acetate and that is preferably a substantially completely or fully hydrolyzed polyvinyl alcohol. Most preferably it is at least about 90% hydrolyzed polyvinyl alcohol, and more preferably 97 or 98 to 100% hydrolyzed polyvinyl alcohol. Such polyvinyl alcohols are preferably used so as to be soluble in water at elevated temperatures of about 60° C. to about 95° C., but are insoluble in cold water. Stabilizer(s) are optional for both direct addition to the gypsum slurry and/or to the wax emulsions. If added to the wax emulsions, they may be about 0 up to about 30 percent by weight of the wax emulsion. If used, stabilizers preferably make up about 1 percent to about 30 percent by weight of the wax emulsion. Stabilizers may be present also in embodiments having about 0 percent to about 20 percent by weight of the wax-based emulsion, more preferably about 0 to about 10 percent by weight and most preferably about 0.01 percent to about 8 percent by weight thereof. If polyvinyl alcohol is used in combination with a wax blend based on a paraffin wax, it may be present in an amount of about 0 to about 50 parts, preferably about 1 part to about 20 parts, by weight, per 100 parts of the paraffinic wax. The polyvinyl alcohol can provide adhesive characteristics as well as enhancing the water resistance and so can be directly added to the slurry as well as incorporated through the wax emulsion.

Saponifiers or saponifying agents are preferably also used in wax emulsions herein. Suitable saponifiers include any of a variety of alkali metal hydroxides and similar materials such as potassium hydroxide, ammonium hydroxide, sodium hydroxide, magnesium sulfate and the like. Saponifiers may be present in an amount of no greater than about 5 weight percent of the emulsion, preferably no greater than about 2 weight percent and most preferably about 0.01 weight percent to about 1 weight percent.

Dispersants used in the wax emulsions may be the same as are noted above with respect to the slurry. Dispersants is provided through the wax emulsion are preferably present in an amount of about 0.01 percent by weight to about 10 percent by weight of the wax emulsion, and preferably about 0.1 percent to about 6 percent by weight of the wax emulsion.

In one preferred embodiment, using a wax emulsion, a dispersant selected from the group consisting of lignosulfonic acid, naphthalene sulfonic acid, and combinations and salts thereof is added to the gypsum formulation with the first additives described above as well as at least one of the second additives, and particularly preferred second additives used herein including a wetting agent and/or surfactant, and at least one or more of N-dodecyl 2-pyrrolidone, ethoxylated alcohol, and combinations thereof. These components may be added directly to the slurry or through the optional wax emulsion. In preferred embodiments the use of an ethylene vinyl acetate copolymer, a wetting agent, a dispersant and either or both of a N-dodecyl 2-pyrrolidone and ethoxylated alcohol together provide synergy with respect to the rheological, water absorbing character and strength of the composition.

In one further embodiment using the optional wax emulsion to provide to the settable gypsum composition herein, the composition may include about 35 percent by weight to about 80 percent by weight of the water, preferably about 50 percent by weight to about 65 percent by weight of the water; about 15 percent by weight to about 60 percent by weight of a blend of paraffinic hydrocarbon and the at least one wax, preferably about 20 percent by weight to about 40 percent by weight of the blend of paraffinic hydrocarbon and the at least one wax; about 0.01 percent by weight to about 2 percent by weight of a dispersant, preferably about 0.1 percent by weight to about 2 percent by weight of the dispersant; about 0.001 percent by weight to about 10 percent by weight of the first additive, preferably about 0.01 percent by weight to about 2 percent by weight of the first additive; about 0.001 percent by weight to about 10 percent by weight of the second additive, and preferably about 0.01 percent by weight to about 2 percent by weight of the first additive; and about 0 percent by weight to about 30 percent by weight of at least one stabilizer, preferably about 0 percent by weight to about 10 percent by weight of the at least one stabilizer.

In one method of manufacture of an aqueous wax emulsion herein, the wax or waxes are each heated to the molten state, and if more than one wax is present, the waxes are then blended together. A hot aqueous solution of the other components, such as stabilizers, for example, polyvinyl alcohol, optional saponifiers, the dispersant(s), the first and second additives and any other components used in the emulsion may then be passed with the hot blend of the waxes through a colloid mill and the resulting emulsion is allowed to cool.

Alternatively, a homogenizer may be used instead of a colloid mill. Such homogenizers may be the same general type of equipment used to homogenize milk and other products. In such a method, a mixture of the wax component and the emulsifying components are fed under high pressure (typically about 1500 psi to about 3500 psi) to emulsify the wax(es) and create a smaller particle size than is typically associated with use of a colloid mill. It will be understood to one skilled in the art based upon this disclosure that other manufacturing methods and types of equipment and procedures for preparing the emulsion can be used, as are known or which may be developed in the art. The emulsion of the invention may also readily be reformed by agitation, in the event that emulsified components of the emulsion separate on storage.

The basic slurries or mixtures provided to slurries in the absence of a wax emulsion herein may be made by simply combining the components as in the second step of preparing the non-wax phase of the wax-based emulsion using, for example, a colloid mill, homogenizer or a similar mixing mechanism.

The settable gypsum formulations herein which may include any of the emulsions, mixtures or simply combined with the first and second additives and any other optional additives noted hereinabove are described below. In preparing a gypsum wallboard using the components herein, an aqueous slurry of the gypsum material is prepared in any suitable manner known in the art or to be developed. In an embodiment of the invention, an aqueous emulsion, a simple mixture of additives or individual components according to the invention are then added to the slurry and mixed with the slurry in proportions to provide about 0.5 part to about 20 parts by weight of solids per 100 parts of gypsum. Alternatively, a gypsum slurry may be formed and the strength and rheological enhancing first and second additives and/or optional dispersants, wetting agents and/or surfactants and any other desired components are provided directly to the gypsum slurry without first being mixed with other components.

The base gypsum compositions may be varied in accordance with conventional gypsum formulation requirements in the art of gypsum manufacture. Other ingredients such as foaming agents, other dispersants and set accelerators may be included in the slurry. In addition, it is noted that in preferred embodiments of settable gypsum slurry formulations using mixtures, emulsions, or direct addition of components herein, a ratio of about 0.001:100 to about 10.0:100, more preferably about 0.01:100 to about 2.0:100, and most preferred about 0.1:100 to about 1.0:100, preferably exists between the strength additive(s) and the gypsum in the slurry. While this is not required, it contributes to achieving beneficial strength properties.

In preparing wallboard from such a settable gypsum formulation, the mixture of gypsum slurry and the mixtures, emulsions or components in various embodiments of the invention can be applied to a first sheet of wallboard liner to form a layer of the gypsum mixture thereon. A second sheet of liner may then be disposed on top of the deposited layer to form a wallboard assembly or structure in which the first and second sheets are in opposed, facing relationship and have the layer of the gypsum mixture therebetween. Alternatively, the gypsum slurry may be prepared directly into a liner-less wallboard structure using manufacturing methods involving press-in-place molding and similar techniques, such that reference to gypsum wallboard herein, is not restricted to liner-covered wallboard. However, it should be understood that any manufacturing technique for making wallboard including a settable gypsum formulation is within the scope of the invention described herein, such as for example, wallboard manufactured with glass mats on the exterior surfaces instead of standard liners.

The resulting structure or assembly may then be dried, such as by oven drying to remove excess water not needed for hydration of the gypsum, to leave finished gypsum wallboard. If liners are used, they may be formed of paper or may comprise fiberglass or organic fiber mats as well. Use of the compositions of the invention and/or providing the preferred first and second additives and optional dispersants to the slurry help to reduce drying time and/or heat, thereby contributing to energy savings in the manufacture of such gypsum wallboards as well as enhancing strength. In forming water-resistant gypsum wallboard, wax-based emulsions herein may be used, and for standard wallboard, such emulsions may be omitted or used as desired.

The invention provides an improvement to prior methods of preparing gypsum wallboard, in that the emulsions, mixtures or direct additives herein, when prepared and added to the gypsum slurry, or when directly provided to the gypsum slurry so as to include the first and second additives herein, help to provide strong wallboard. Further, use of the wetting agents and/or surfactants, and organic zirconium and/or titanium compounds noted herein with optional dispersants may further contribute to reducing slurry viscosity, providing synergistic strength enhancement and thereby provide strong wallboard, reduced water content to enable reduction in drying time and/or heat and thus the use of energy in manufacture.

This method is also an improvement when using wax-based formulations herein in water-resistant gypsum wallboard. Thus, the invention further includes a method to strengthen and/or reduce energy use in manufacture of building products, such as gypsum wallboard, by providing to the formulations used for forming such building products, prior to any drying step(s) in the manufacturing process of these building products an emulsion, mixture or direct additive(s) according to the invention as described herein including the first and second additives. If a water-resistant gypsum wallboard is being formed, a wax-based emulsion as described herein may be used.

The invention also includes an improvement for a method of making gypsum wallboard, wherein such a method comprises preparing a gypsum slurry, using the gypsum slurry to form a structure and drying the structure to form a gypsum wallboard, and wherein the improvement comprises providing a gypsum slurry, comprising water and a first additive comprising one or more vinyl acetate/ethylene copolymer(s) in latex or emulsion form and a second additive which may be one or more of a wetting agent and/or a surfactant, an organic titanium compound and/or an organic zirconium compound. The method may further include placing the gypsum slurry between two liners to faun the structure.

The invention also includes a method for improving strength in gypsum wallboard, comprising, providing a formulation for foaming a gypsum wallboard comprising a gypsum slurry; and a first additive comprising one or more vinyl acetate/ethylene copolymer(s) in latex or emulsion form and a second additive which may be one or more of a wetting agent and/or a surfactant, an organic titanium compound and/or an organic zirconium compound.

The invention will now be described with respect to the following non-limiting examples:

Example 1

In this example, boards were made for testing. All liquids were added such as water, any optional wax, any of the first and second additives for rheological and strength enhancement such as additives an ethylene vinyl acetate latex, a wetting agent and/or surfactant and/or an organic titanium and/or zirconium compound to a Waring® industrial kitchen blender. Stucco was then mixed with starch and accelerator (BMA—ball mill accelerator). The stucco was allowed to soak in the liquids for about 10 seconds then the blender was turned to medium speed for about 15 seconds. The resulting slurries were poured into a form with paper. At two times the Vicat set, the forms were broken open and the boards moved to an oven set at 176° C. After 18 minutes, the boards were flipped and dried for an additional 18 minutes. Following which, the boards were dried at 43° C. for 24 hours. After cooling to room temperature, the boards were cut and tested.

Flexural bending (3-point bend) tests were performed as described in ASTM International Testing Standard ASTM C 473, with the exception that the equipment used could not accommodate a board as big as required in the ASTM C 473 standard, so 3 in by 10 in boards were used for the flexural testing. The ratios were maintained and correlation factors were used as described in the test method to adjust the data. A nail pull test was also carried out as described in the same ASTM C 473 test method. Specification tests were also conducted under ASTM C 1396.

Impact testing data, resulting from testing done according to ASTM C 1629 (the hard body method) was also collected on samples. In these tests, the boards were manufactured boards having additives according to the present invention provided thereto (boards were made at a commercial board manufacturing facility). Six sets of board sample formulations were prepared, each having a control as shown in Table 1 herein. Controls are identified as Control Samples A, B, C, D and E for each set of board samples. Inventive examples are identified by number followed by the letter corresponding to the set A-E. In the samples, the various commercial VAE copolymers used are indicated along with the makeup of the compositions which was kept relatively constant. The type of gypsum used was a standard wallboard manufactured according to ASTM C1936, Type III, Grade R, Class 1, meeting Application Standards ASTM C830 and GA216. The starch used was a commercial starch, Wallboard Binder, Industrial Starch-Modified from Tate & Lyle. The VAE percent used is also shown, as is the additional surfactant (soap) which was Cedepal® FA-406, available from Stepan in a 5% blend in water. The set time was measured in minutes:seconds.

TABLE 1

| Component | Control A | 1A | 2A | 3A | 4A | 5A | 6A | 7A |
|---|---|---|---|---|---|---|---|---|
| VAE | — | Dur-O-Set® 3610 | Vinnapas® 401 | Vinnapas® 405 | Vinnapas® 410 | Vinnapas® 426 | Vinnapas® 460 | Vinnapas® 465 |
| VAE (%) | — | 0.45 | 0.5 | 0.5 | 0.5 | 0.57 | 0.57 | 0.61 |
| Gypsum (g) | 900 | 900 | 900 | 900 | 900 | 900 | 900 | 900 |
| Accelerator (g) | 0.19 | 0.19 | 0.19 | 0.19 | 0.19 | 0.19 | 0.19 | 0.19 |
| Starch (g) | 3.3 | 3.3 | 3.3 | 3.3 | 3.3 | 3.3 | 3.3 | 3.3 |
| Water (g) | 900 | 900 | 900 | 900 | 900 | 900 | 900 | 900 |
| Soap | 2.6 | 2.6 | 2.6 | 2.6 | 2.6 | 2.6 | 2.6 | 2.6 |
| Initial Set | 3:28 | 3:24 | 3:30 | 3:34 | 3:50 | 3:20 | 3:42 | 3:34 |
| Wet 12X12 | 1667.88 | 1615.69 | 1568.63 | 1582.48 | 1665.08 | 1626.36 | 1607.46 | 1626.85 |
| Dry 12X12 | 1017.91 | 991.91 | 955.65 | 966.24 | 1019.95 | 933.06 | 980.63 | 993.94 |
| Moisture (%) | 63.85 | 62.89 | 64.14 | 63.78 | 63.25 | 63.94 | 63.92 | 63.68 |

| Component | Control B | 1B | 2B | 3B | 4B | 5B | 6B | 7B |
|---|---|---|---|---|---|---|---|---|
| VAE | — | Dur-O-Set® 3610 | Vinnapas® 920 | Airflex® 7200 | Synthemul® HS200 | Airflex® EN1165 | Airflex® 315 | Airflex® 320 |
| VAE (%) | — | 0.45 | 0.5 | 0.65 | 0.58 | 0.47 | 0.5 | 0.5 |
| Gypsum (g) | 900 | 900 | 900 | 900 | 900 | 900 | 900 | 900 |
| Accelerator (g) | 0.19 | 0.19 | 0.19 | 0.19 | 0.19 | 0.19 | 0.19 | 0.19 |
| Starch (g) | 3.3 | 3.3 | 3.3 | 3.3 | 3.3 | 3.3 | 3.3 | 3.3 |
| Water 9 g) | 900 | 900 | 900 | 900 | 900 | 900 | 900 | 900 |
| Soap | 2.6 | 2.6 | 2.6 | 2.6 | 2.6 | 2.6 | 2.6 | 2.6 |
| Initial Set | 4:00 | 3:54 | 4:00 | 3:58 | 4:07 | 4:08 | 4:09 | 4:10 |
| Wet 12X12 | 1531.82 | 1554.56 | 1677.45 | 1660.98 | 1678.38 | 1612.82 | 1642.33 | 1646.64 |
| Dry 12X12 | 941.63 | 958.65 | 1030.24 | 1023.19 | 1027.21 | 988.68 | 1003.03 | 1006.75 |
| Moisture (%) | 62.68 | 62.16 | 62.82 | 62.33 | 63.39 | 63.13 | 63.74 | 63.56 |

| Component | Control C | 1C | 2C | 3C | 4C | 5C | 6C | 7C |
|---|---|---|---|---|---|---|---|---|
| VAE | — | Dur-O-Set® 3610 | Dur-O-Set® CP137 | Dur-O-Set® CP1219 | Vinnapas® EF 811 | Vinnapas® EN 1267 | Vinnapas® EZ 222 | Airflex® 728 |
| VAE (%) | — | 0.45 | 0.5 | 0.5 | 0.5 | 0.47 | .5 | 0.48 |
| Gypsum (g) | 900 | 900 | 900 | 900 | 900 | 900 | 900 | 900 |
| Accelerator (g) | 0.19 | 0.19 | 0.19 | 0.19 | 0.19 | 0.19 | 0.19 | 0.19 |
| Starch (g) | 3.3 | 3.3 | 3.3 | 3.3 | 3.3 | 3.3 | 3.3 | 3.3 |
| Water (g) | 900 | 900 | 900 | 900 | 900 | 900 | 900 | 900 |
| Soap | 2.6 | 2.6 | 2.6 | 2.6 | 2.6 | 2.6 | 2.6 | 2.6 |
| Initial Set | 3:48 | 3:45 | 3:40 | 3:40 | 3:33 | 3:35 | 3:48 | 3:41 |
| Wet 12X12 | 1611.31 | 1633.41 | 1510.33 | 1641.26 | 1651.25 | 1588.85 | 1678.84 | 1546.08 |
| Dry 12X12 | 990.02 | 1000.18 | 923.29 | 1002.39 | 1008.43 | 962.73 | 1026.61 | 931.3 |
| Moisture Content | 62.76 | 63.31 | 63.58 | 63.73 | 63.74 | 65.04 | 63.53 | 66.01 |

| Component | Control D | 1D | 2D | 3D | 4D | 5D | 6D | 7D |
|---|---|---|---|---|---|---|---|---|
| VAE | — | Dur-O-Set® 3610 | Elvace® CPS 720 | Elvace® 785 (55%) | Elvace® 786 (55%) | Vinnapas® 323 | AirFlex® 400 | Vinnapas® 400H |
| VAE (%) | — | 0.45 | 0.5 | 0.5 | 0.5 | 0.5 | 0.5 | 0.5 |
| Gypsum (g) | 900 | 900 | 900 | 900 | 900 | 900 | 900 | 900 |
| Accelerator (g) | 0.19 | 0.19 | 0.19 | 0.19 | 0.19 | 0.19 | 0.19 | 0.19 |
| Starch (g) | 3.3 | 3.3 | 3.3 | 3.3 | 3.3 | 3.3 | 3.3 | 3.3 |
| Water (g) | 900 | 900 | 900 | 900 | 900 | 900 | 900 | 900 |
| Soap | 2.6 | 2.6 | 2.6 | 2.6 | 2.6 | 2.6 | 2.6 | 2.6 |
| Initial Set | 3:33 | 3:25 | 3:10 | 3:40 | 3:40 | 3:33 | 3:28 | 3:51 |
| Wet 12X12 | 1579.55 | 1565.02 | 1482.38 | 1599.64 | 1634.12 | 1583.03 | 1601.65 | 1641.61 |
| Dry 12X12 | 967.38 | 957.29 | 911.42 | 969.49 | 1003.88 | 961.38 | 982.5 | 1002.37 |
| Moisture Content | 63.28 | 63.48 | 62.66 | 65.00 | 62.78 | 64.66 | 63.02 | 63.77 |

TABLE 1-continued

| Component | Control E | 1E | 2E | 3E | 4E | 5E | 6E |
|---|---|---|---|---|---|---|---|
| VAE | — | Dur-O-Set® 3610 | Vinnapas® EP 1400 | Vinnapas® 192 | AirFlex® 400 | Dur-O-Set® CP 3610 | AirFlex® 400 |
| VAE (%) | — | 0.5 | 0.5 | 0.5 | 0.5 | 1.0 | 1.0 |
| Gypsum (g) | 900 | 900 | 900 | 900 | 900 | 900 | 900 |
| Accelerator (g) | 0.19 | 0.19 | 0.19 | 0.19 | 0.19 | 0.19 | 0.19 |
| Starch (g) | 3.3 | 3.3 | 3.3 | 3.3 | 3.3 | 3.3 | 3.3 |
| Water (g) | 900 | 900 | 900 | 900 | 900 | 900 | 900 |
| Soap | 2.6 | 2.6 | 2.6 | 2.6 | 2.6 | 2.6 | 2.6 |
| Initial Set | 4:34 | 4:35 | 4:00 | 3:48 | 4:15 | 4:00 | 3:57 |
| Wet 12X12 | 1439.36 | 1620.06 | 1547.26 | 1485.03 | 1598.02 | 1541.09 | 1591.31 |
| Dry 12X12 | 906.77 | 1004.04 | 965.96 | 922.74 | 988.76 | 959.02 | 988.25 |
| Moisture Content | 58.73 | 61.35 | 60.18 | 60.83 | 61.62 | 60.69 | 61.02 |

Multiple trials of each sample were run (3 trials each) and the average data generated for each. For each different VAE additive, average data from each sample having that VAE additive was calculated and the average data are reported in Table 2 below.

TABLE 2

| Average VAE Sample | Density (g/cu.in.) | Lbs/MSF | Nail pull (lbf) | Load (lbf) | MOR (psi) |
|---|---|---|---|---|---|
| ControlsA-E | 37.16 | 2067 | 54.93 | 37.25 | 373.8 |
| 1A-1E | 33.17 | 2127 | 69.03 | 47.52 | 517.8 |
| 2A | 38.69 | 2036 | 77.80 | 40.51 | 456.9 |
| 3A | 39.47 | 2095 | 75.21 | 40.25 | 446.4 |
| 4A | 40.26 | 2174 | 83.40 | 47.55 | 509.5 |
| 5A | 38.78 | 2131 | 77.35 | 47.72 | 494.0 |
| 6A | 38.68 | 2122 | 70.01 | 46.93 | 487.3 |
| 7A | 39.03 | 2111 | 70.12 | 44.67 | 477.3 |
| 2B | 35.20 | 2018 | 63.68 | 44.00 | 418.3 |
| 3B | 36.24 | 2045 | 66.65 | 52.56 | 515.5 |
| 4B | 37.58 | 2088 | 71.69 | 51.18 | 518.2 |
| 5B | 37.68 | 2025 | 69.72 | 51.39 | 555.8 |
| 6B | 34.16 | 1971 | 57.72 | 39.89 | 374.5 |
| 7B | 34.29 | 1988 | 57.36 | 44.26 | 404.2 |
| 2C | 39.78 | 2108 | 76.13 | 49.28 | 548.2 |
| 3C | 39.31 | 2139 | 80.76 | 53.50 | 563.6 |
| 4C | 43.02 | 2199 | 90.08 | 57.26 | 685.0 |
| 5C | 39.27 | 2122 | 71.50 | 38.34 | 517.6 |
| 6C | 40.99 | 2202 | 85.09 | 57.63 | 624.0 |
| 7C | 38.27 | 2019 | 68.56 | 46.77 | 525.3 |
| 2D | 40.29 | 2139 | 72.99 | 44.67 | 495.4 |
| 3D | 40.04 | 2113 | 75.35 | 59.95 | 672.6 |
| 4D | 41.71 | 2190 | 83.94 | 58.39 | 661.3 |
| 5D | 38.74 | 2036 | 70.30 | 53.82 | 609.0 |
| 6D | 39.61 | 2113 | 77.43 | 50.19 | 550.8 |
| 7D | 38.99 | 2078 | 75.52 | 54.69 | 601.4 |
| 2E | 39.45 | 2174 | 82.24 | 41.83 | 430.4 |
| 3E | 42.22 | 2263 | 86.79 | 52.28 | 568.5 |
| 4E | 39.33 | 2126 | 70.81 | 49.07 | 524.8 |
| 5E | 42.81 | 2204 | 87.60 | 39.16 | 461.4 |
| 6E | 39.97 | 2115 | 77.26 | 35.97 | 401.5 |

As the data demonstrate, the ethylene vinyl acetate copolymers in combination with surfactant additives noted provide enhanced strength and good rheological properties to the gypsum samples.

It will be appreciated by those skilled in the art that changes could be made to embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A settable gypsum composition, comprising:
   a gypsum slurry, consisting of a standard calcium sulfate hemihydrate gypsum and at least about 35 percent by weight of water; and
   a combination of at least one first additive and a second additive, wherein
      the first additive is a vinyl acetate/ethylene copolymer in latex or emulsion form; and
      the second additive is at least one of (i) a wetting agent and/or a surfactant having an HLB of from about 3 to about 16; (ii) a titanium coupling agent, (iii) a zirconium coupling agent, and (iv) mixtures thereof, and wherein the first and second additives are in the gypsum slurry in weight ratios of about 0.001:100 to about 10.0:100 based on the combined weight of the first and second additives to the weight of the gypsum slurry.

2. The settable gypsum composition, according to claim 1, further comprising at least one dispersant.

3. The settable gypsum composition according to claim 2, wherein the at least one dispersant comprises sulfur or a sulfur-containing group.

4. The settable gypsum composition according to claim 3, wherein the dispersant is lignosulfonic acid, naphthalene sulfonic acid, and combinations and salts thereof.

5. The settable gypsum composition according to claim 2, wherein the second additive comprises the wetting agent and/or the surfactant.

6. The settable gypsum composition according to claim 5, wherein the wetting agent and/or the surfactant is selected from the group consisting of fatty alcohols, ethoxylated alcohols, vegetable oil ethoxylates, alkyl phenol ethoxylates, monobasic esters, silicone polyethers, alkylated or alkenylated pyrrolidone-based compounds, asphaltene dispersants, acetylenic diols, ethylene oxide/polyethylene oxide block copolymers, polyethylene glycols, polyethylene glycol esters, alkylbenzenesulfonic acids, alkylbenzene sulfonate, sodium salts, potassium salts, amine salts, sodium alkylated diphenyl oxide disulfonates, amine oxides, amine ethoxylates, alkanolamides, sodium and ammonium aromatic sulfonates, alcohol sulfates, alcohol ether sulfates, ethoxylated alcohol phosphate esters, ethoxylated alcohol sulfates, sodium alkyl sulfonates, sodium alpha sulfo methyl esters, sodium dialkyl sulfosuccinates, and fluoroaliphatic surfactants.

7. The settable gypsum composition according to claim 1, wherein the second additive comprises the wetting agent and/or the surfactant.

8. The settable gypsum composition according to claim 1, comprising a dispersant selected from the group consisting of lignosulfonic acid, naphthalene sulfonic acid, and combinations and salts thereof and wherein the second additive is the wetting agent and/or the surfactant and is selected from the group consisting of N-dodecyl 2-pyrrolidone, ethoxylated alcohol, and combinations thereof.

9. The settable gypsum composition according to claim 1, wherein the second additive is the wetting agent and/or the surfactant and the composition comprises:
- about 75 percent by weight to about 99.999 percent by weight of the gypsum slurry;
- about 0 percent by weight to about 5 percent by weight of a dispersant;
- about 0.001 percent by weight to about 10 percent by weight of the first additive; and
- about 0 percent by weight to about 10 percent of the wetting agent and/or the surfactant.

10. The settable gypsum composition according to claim 9, comprising:
- about 87 percent by weight to about 96.89 percent by weight of the gypsum slurry;
- about 0.1 percent by weight to about 2 percent by weight of the dispersant;
- about 0.01 percent by weight to about 2 percent by weight of the first additive; and
- about 0.01 percent to about 3 percent of the surfactant and/or wetting agent.

11. The settable gypsum composition according to claim 1, further comprising, a wax emulsion, wherein the first additive and the second additive are incorporated into the wax emulsion prior to incorporating the wax emulsion into the gypsum slurry.

12. The settable gypsum composition according to claim 11, wherein the wax emulsion comprises,
- water;
- at least one wax;
- the first additive comprising a vinyl acetate/ethylene copolymer in latex or emulsion form; and
- the second additive.

13. The settable gypsum composition according to claim 12, wherein the at least one wax comprises one or more of montan wax, paraffin wax, carnauba wax, a Fischer-Tropsch wax, and derivatives and blends thereof.

14. The settable gypsum composition according to claim 12, wherein the at least one wax is a blend of paraffin wax with montan wax.

15. The settable gypsum composition according to claim 12, further comprising a polyvinyl alcohol stabilizer.

16. The settable gypsum composition according to claim 15, wherein the polyvinyl alcohol is about 97% to about 100% hydrolyzed polyvinyl alcohol.

17. The settable gypsum composition according to claim 12, further comprising a saponifying agent which is an alkali metal hydroxide.

18. The settable gypsum composition according to claim 17, wherein the alkali metal hydroxide is potassium hydroxide.

19. The settable gypsum composition according to claim 12, further comprising a dispersant comprising a sulfur or a sulfur-containing group.

20. The settable gypsum composition according to claim 19, wherein the dispersant is lignosulfonic acid, naphthalene sulfonic acid, and combinations and salts thereof.

21. The settable gypsum composition according to claim 12, wherein the second additive comprises the wetting agent and/or the surfactant.

22. The settable gypsum composition according to claim 1, wherein the wetting agent and/or the surfactant is selected from the group consisting of fatty alcohols, ethoxylated alcohols, vegetable oil ethoxylates, alkyl phenol ethoxylates, monobasic esters, silicone polyethers, alkylated or alkenylated pyrrolidone-based compounds, asphaltene dispersants, acetylenic diols, ethylene oxide/polyethylene oxide block copolymers, polyethylene glycols, polyethylene glycol esters, alkylbenzenesulfonic acids, alkylbenzene sulfonate, sodium salts, potassium salts, amine salts, sodium alkylated diphenyl oxide disulfonates, amine oxides, amine ethoxylates, alkanolamides, sodium and ammonium aromatic sulfonates, alcohol sulfates, alcohol ether sulfates, ethoxylated alcohol phosphate esters, ethoxylated alcohol sulfates, sodium alkyl sulfonates, sodium alpha sulfo methyl esters, sodium dialkyl sulfosuccinates, and fluoroaliphatic surfactants.

23. The settable gypsum formulation according to claim 12, comprising a dispersant selected from the group consisting of lignosulfonic acid, naphthalene sulfonic acid, and combinations and salts thereof and wherein the second additive is the wetting agent and/or the surfactant and is selected from the group consisting of 1-dodecyl 2-pyrrolidone, ethoxylated alcohol, and combinations thereof.

24. The settable gypsum composition according to claim 12, comprising:
- about 35 percent by weight to about 80 percent by weight of the water;
- about 15 percent by weight to about 60 percent by weight of a blend of paraffinic hydrocarbon and the at least one wax;
- about 0.01 percent by weight to about 2 percent by weight of a dispersant;
- about 0.001 percent by weight to about 10 percent by weight of the first additive;
- about 0.001 percent by weight to about 10 percent by weight of the second additive; and
- about 0 percent by weight to about 30 percent by weight of at least one stabilizer.

25. The settable gypsum composition according to claim 24, comprising:
- about 50 percent by weight to about 65 percent by weight of the water;
- about 20 percent by weight to about 40 percent by weight of the blend of paraffinic hydrocarbon and the at least one wax;
- about 0.1 percent by weight to about 2 percent by weight of the dispersant;
- about 0.01 percent by weight to about 2 percent by weight of the first additive;
- about 0.01 percent by weight to about 2 percent by weight of the second additive; and
- about 0 percent by weight to about 10 percent by weight of the at least one stabilizer.

* * * * *